Figure 1:
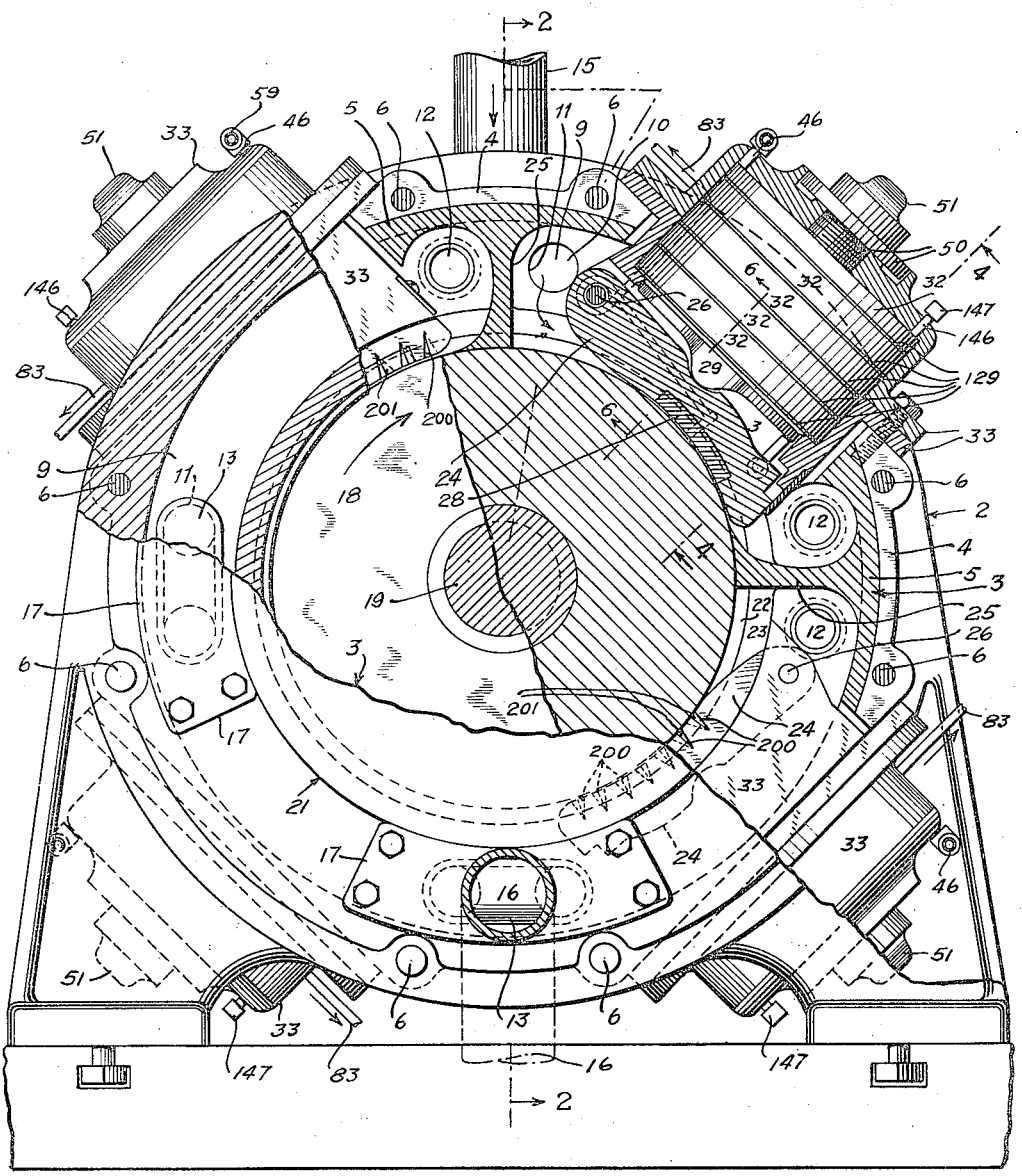

July 20, 1937.  C. P. TOLMAN  2,087,561
MATERIAL TREATING APPARATUS
Original Filed April 14, 1931   10 Sheets-Sheet 1

INVENTOR
Charles P. Tolman
BY Janney Blair & Curtis
his ATTORNEYS

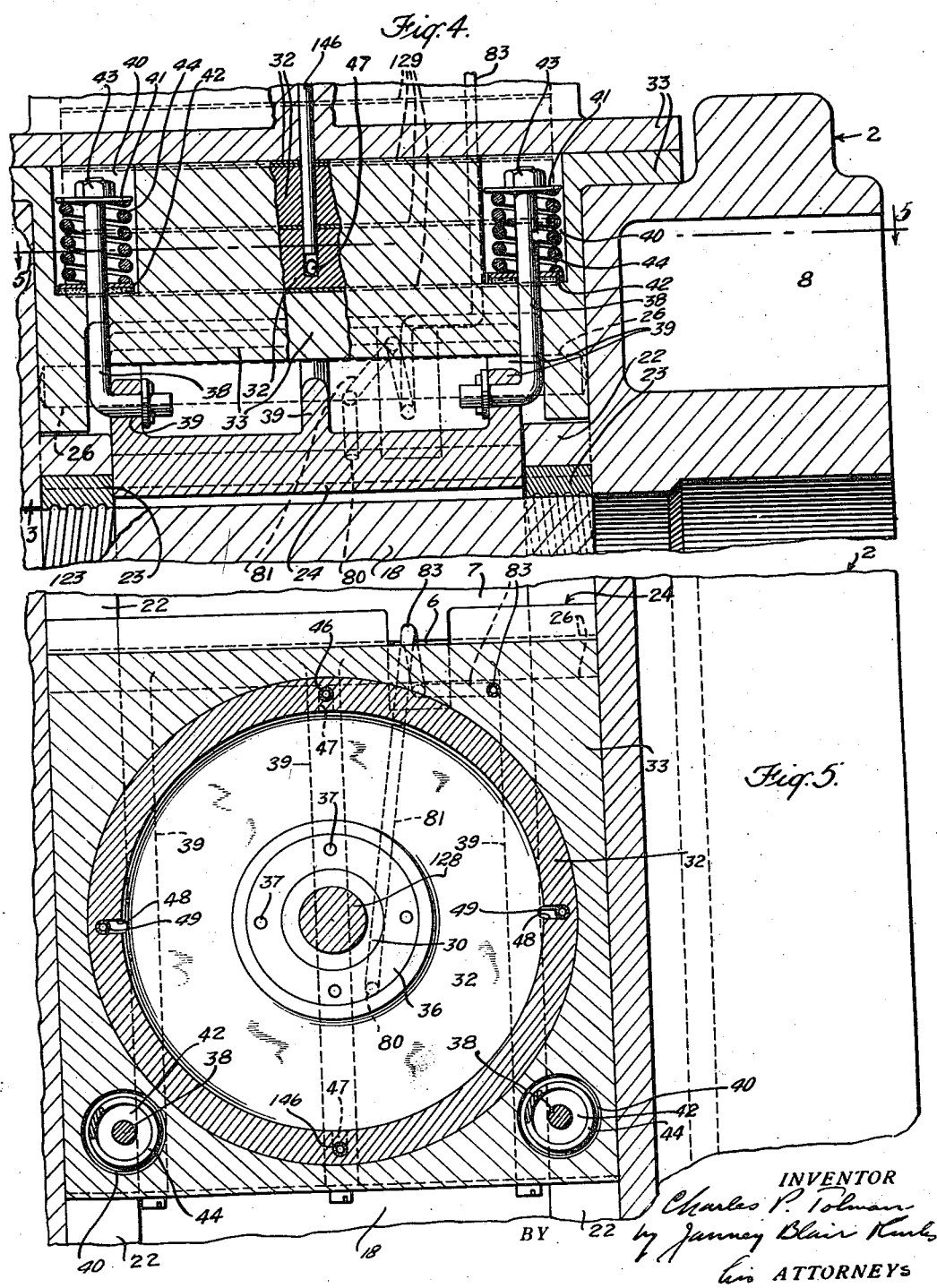

July 20, 1937.  C. P. TOLMAN  2,087,561
MATERIAL TREATING APPARATUS
Original Filed April 14, 1931   10 Sheets-Sheet 5

INVENTOR
Charles P. Tolman
BY Janney Blair Curtis
his ATTORNEYS

July 20, 1937.   C. P. TOLMAN   2,087,561
MATERIAL TREATING APPARATUS
Original Filed April 14, 1931   10 Sheets-Sheet 8

INVENTOR
Charles P. Tolman
BY
Janney Blair Curtis
his ATTORNEYS

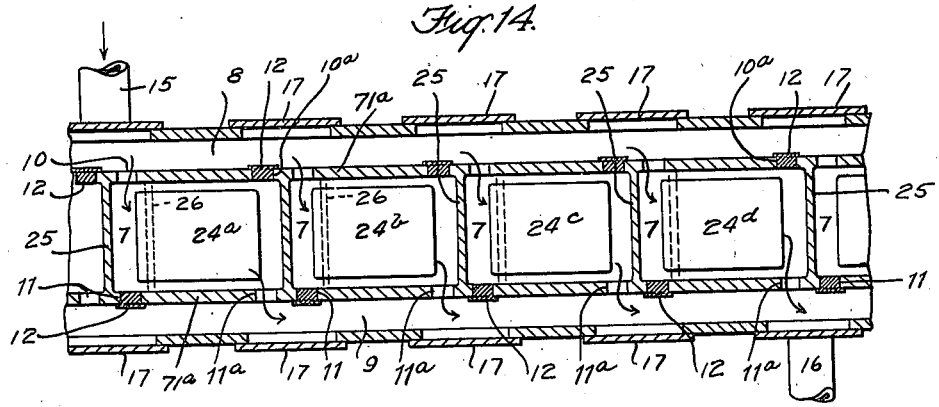
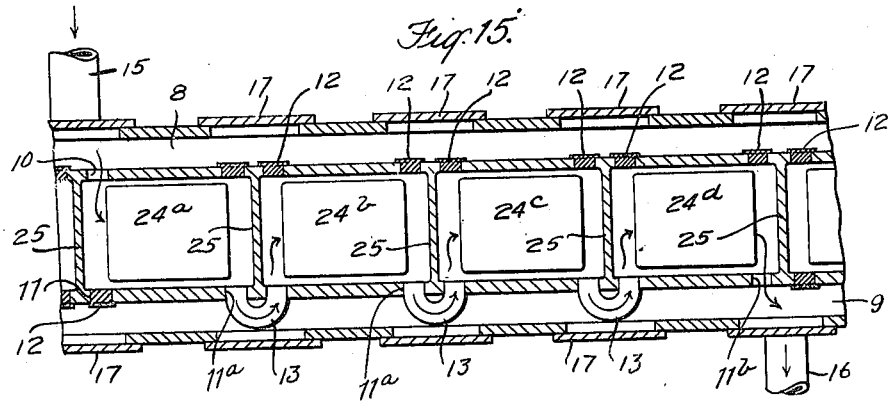
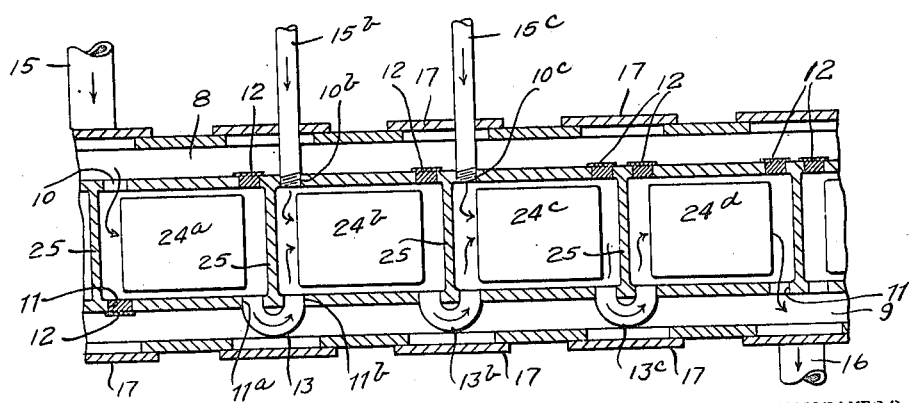

July 20, 1937.                C. P. TOLMAN                2,087,561
                        MATERIAL TREATING APPARATUS
                    Original Filed April 14, 1931    10 Sheets—Sheet 10
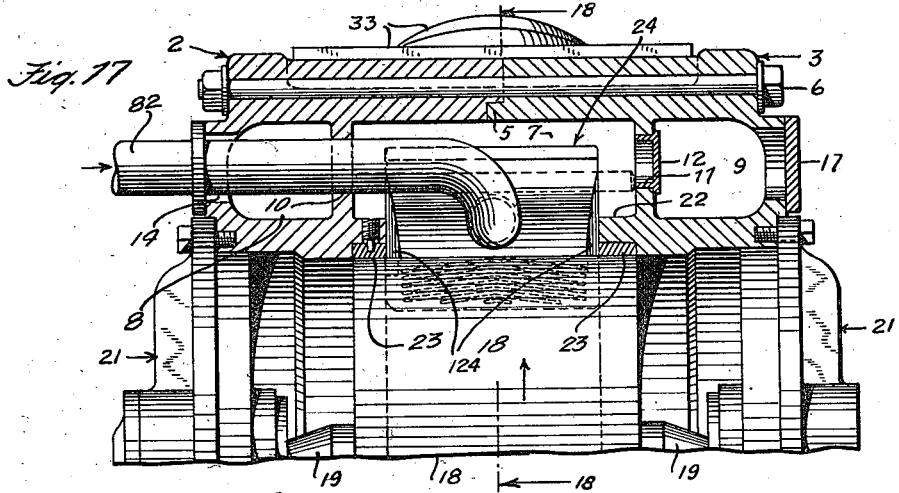
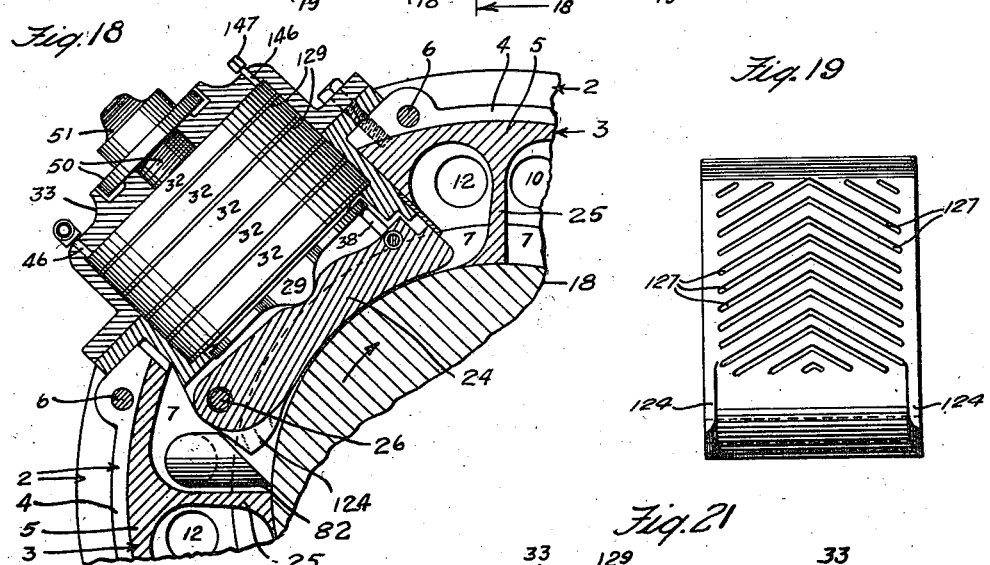
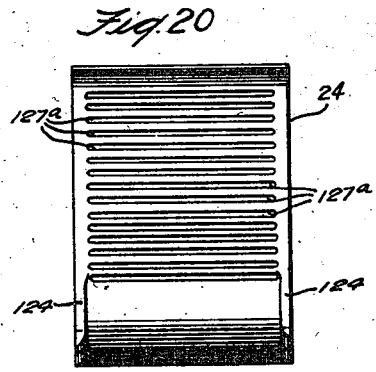
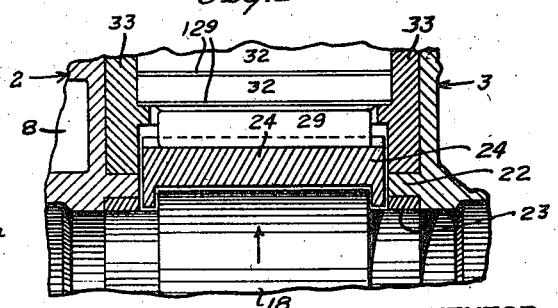
INVENTOR
Charles P. Tolman
BY his ATTORNEYS Patented July 20, 1937

2,087,561

UNITED STATES PATENT OFFICE 2,087,561

MATERIAL TREATING APPARATUS

Charles P. Tolman, Kew Gardens, N. Y., assignor, by mesne assignments, to The Noble & Wood Machine Co., Hoosick Falls, N. Y., a corporation of New York Application April 14, 1931, Serial No. 529,963
Renewed March 1, 1937

22 Claims. (Cl. 83—14)

The present invention relates to an improvement in material treating apparatus. One object has been to provide in the field of homogenizing, deflocculating, dispersing, reducing machines and the like, an improved device which, while permitting full realization of the useful phenomena incident to film shearing, presents advantages over previously known material treating devices both in respect to per-unit output of treated material and range of variety in treatments and products.

Reference is made herein to copending applications as follows: Serial No. 717,717, filed by me March 28, 1934 relating to Stuff treatment apparatus, wherein the stator element includes a plurality of shoes arranged to be operated singly or in series by hydraulic means, and the working periphery of the rotor is provided with grooves; Serial No. 60,470, filed by me January 23, 1936, relating to a Method of treating fibrous material, said application being a continuation of Serial No. 717,717 aforesaid; Serial No. 717,719, filed by James T. Coghill, March 28, 1934, relating to Feed pressure control apparatus; and Serial No. 717,718, filed by James T. Coghill and Charles P. Tolman, March 28, 1934, and relating to a Stuff treatment machine and junk remover, patent thereon No. 2,042,566 having issued June 2, 1936.

Known types of material treating devices such as colloid mills are equipped with rotors designed to operate at peripheral speeds between five thousand and fifteen thousand feet per minute; and, in general, the shearing gap is of the order of .005 to .008 of an inch. Experience demonstrates that their usefulness in industry is materially limited by their relatively small rate of output. Normally the solution of the problem would lie in increasing the size of the mill; but efforts in this direction have not succeeded, due in part to the extreme difficulty of making and maintaining under working conditions the extremely small clearances and tolerances permissible in film shearing operations. Furthermore, even moderate increases in size introduce difficulties attendant upon the relatively large mass of metal necessarily set in motion during operation of the machine. For example, a rotor of 20 inch diameter may, when operating at shearing speeds, increase its diameter by an amount equal to a substantial portion of the width of the shearing gap.

The foregoing and other problems have limited the size and capacity of colloid mills to such an extent that they are not commercially available in many fields of industry even where the principles of colloid mill practice lend themselves most favorably to the manufacturing processes and/or products involved. Accordingly, it has been my object to provide a material treating machine of the colloid mill type which by reason of its capacity and other advantages will find use in industrial fields where the colloid mill, as now known, is commercially inadequate.

The matter of tolerances also bears importantly on problems connected with designing and manufacturing colloid mills. It is readily perceptible that in making a fixed gap machine where the practical extent of gap lies between .005 and .008 of an inch, the difficulties of achieving precision are increased with larger mills due to changes in stresses and strains incident to or following manufacturing processes, such, for example, as machining and heat treatment. It is therefore an object of my invention to provide a type of mill in which precision working tolerances may be established as needed and as an operating factor rather than as an incident of manufacture.

To those skilled in the art, it is well known that, in many instances, a material after treatment in a colloid mill may be more readily and/or effectively treated or chemically combined with another or other materials. Although this is well understood and utilized to a limited extent in connection with present types of colloid mills, the character of apparatus now available is such that only a relatively small portion of the beneficial effect can be secured. It is therefore a further object of my invention to provide material treating apparatus of the colloid mill type in which a given material may be subjected to repeated film shearing operations in quick succession; or, if desired, a given material may, after a film shearing operation, be combined with or reacted on by another material or agent during a subsequent film shearing operation occurring in quick succession. In other words, it is contemplated that my improved mill will permit the introduction or application of one or more additional materials to a material being treated simultaneously with and/or during film shearing operation of the machine, said additional treatment being effected simultaneously with and as a continuation of any preceding film shearing operation performed in the same or similar manner.

In securing the increased capacity hereinabove referred to, I have proceeded on the theory that the film shearing or combined shearing and pressing effect upon any given raw material or upon any material of given predetermined characteristic, assuming proper adjustments of the shearing gap and/or pressure on the material under treatment therein in a suitable mill, is accomplished almost instantaneously; and that continued or extended film shearing or pressing treatment thereafter is largely at the expense of a corresponding waste of power. Furthermore, in many types of mills energy is unproductively expended by driving the rotor with its non-shearing surfaces in friction producing and rotor retarding relation to fixed portions of the machine and/or to masses of the material under treatment. Accordingly, one phase of my present invention involves the use of a plurality of stators, for example, all cooperating simultaneously if desired with a single rotor, each stator when combined with the rotor providing in effect a film shearing unit having means for admitting material on the receiving side and means for discharging material on the outlet side. Since the output rate of such a machine operating with substantially constant feed pressure is in some measure dependent upon the number of stator units combined with a single rotor, it is apparent that I can readily produce a mill adapted for a wide range of commercial uses and having a productive capacity measurably in excess of the maximum output of known types of colloid mills. Another phase of my invention involves the mounting of the rotor in such relation to the casing and the stators that it is practically free running except for retarding forces operating wholly on its periphery during shearing. Accordingly, by confining energy expenditure almost entirely to productive work done in the hydraulic shearing zones at the rotor periphery, my improved mill construction possesses greatly increased per horsepower hour capacity, as compared to other known mills intended for the same or similar purposes.

A further object of my invention has been to provide a material treating machine in which the parts are readily adjustable to adapt them more quickly and effectively to the peculiar requirements of different materials and/or different products. For this purpose the opposed rotor and stator working surfaces are preferably capable of adjustment both as to the extent of the film shearing gap and therefore of the pressure exerted on material undergoing treatment between them and/or as to their angular relationship, thus enabling one machine to operate over an extended field, as compared with that of known colloid mills. Furthermore, with this type of mill, one of the working surfaces, as that of the stator, may be held in operative position by yielding means either combined with or independent of the gap adjusting devices, thus introducing not only an important safety factor in a machine normally operating at high speeds, but also making possible the control of the operation in respect to pressure on the material under treatment as distinguished from extent of gap. The terms "film pressure" and "shearing gap pressure" as used herein mean the effective pressure applied to the material during treatment between the rotor periphery and the stator.

Figure 2:
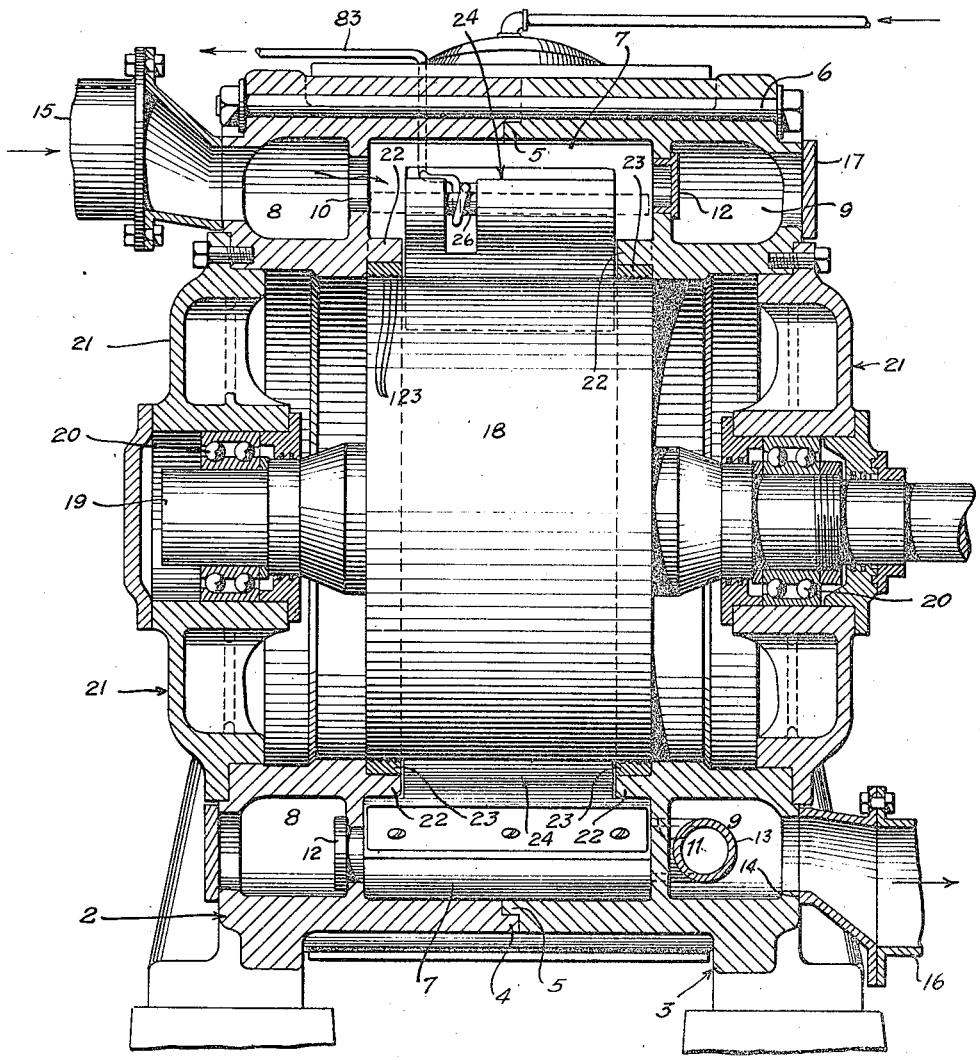
Figure 3:
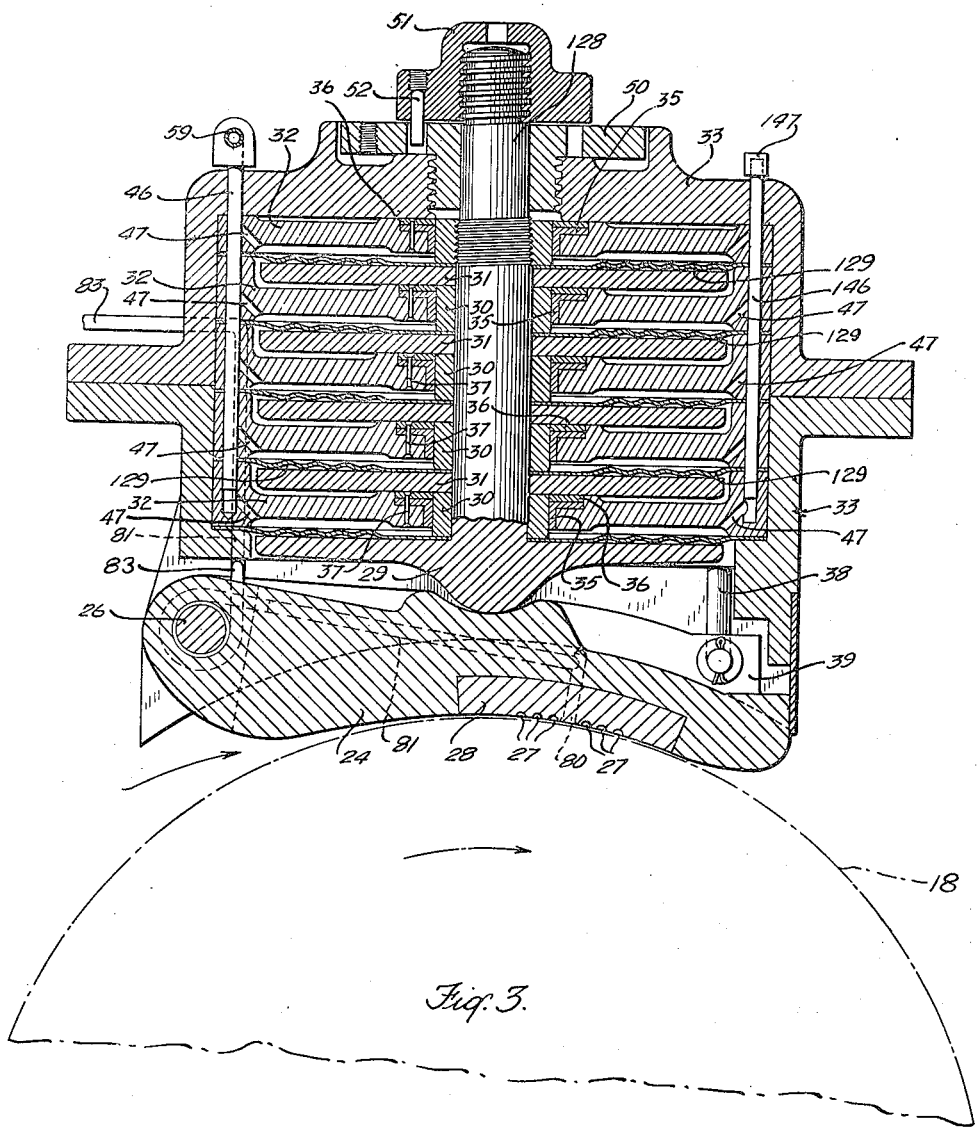
Figure 6:
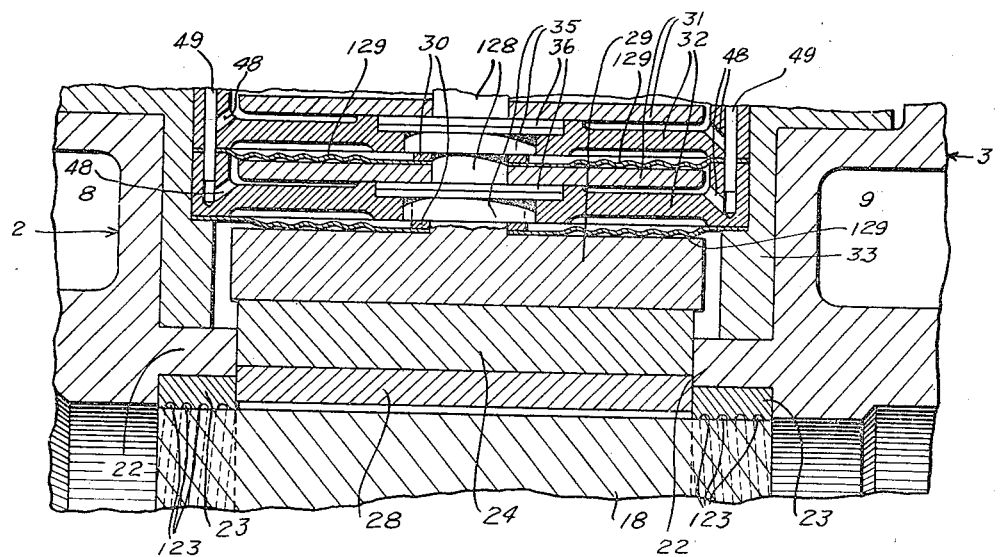
Figure 7:
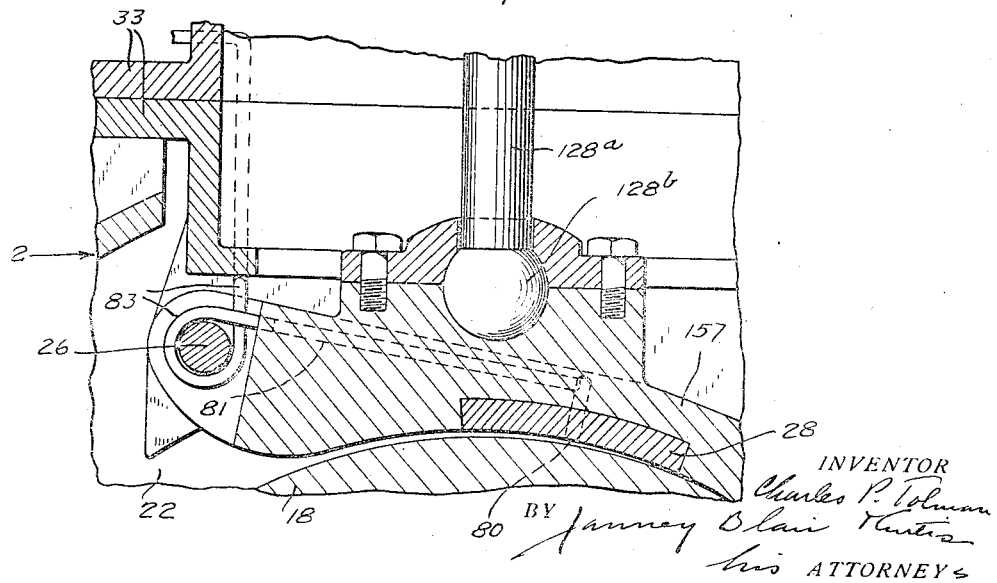
Figure 8:
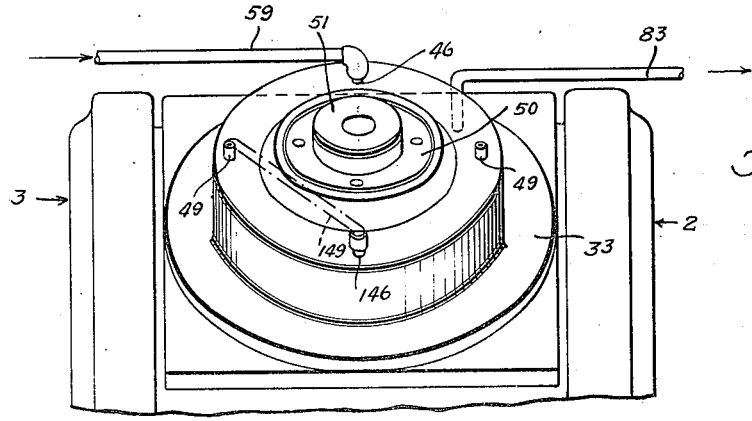
Figure 9:
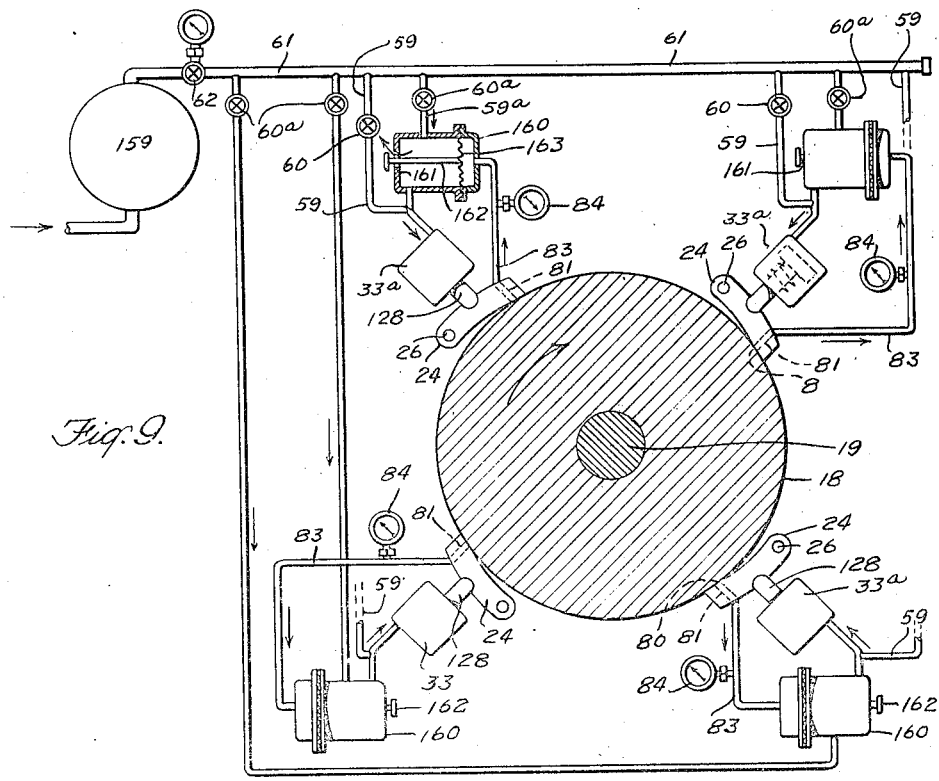
Figure 10:
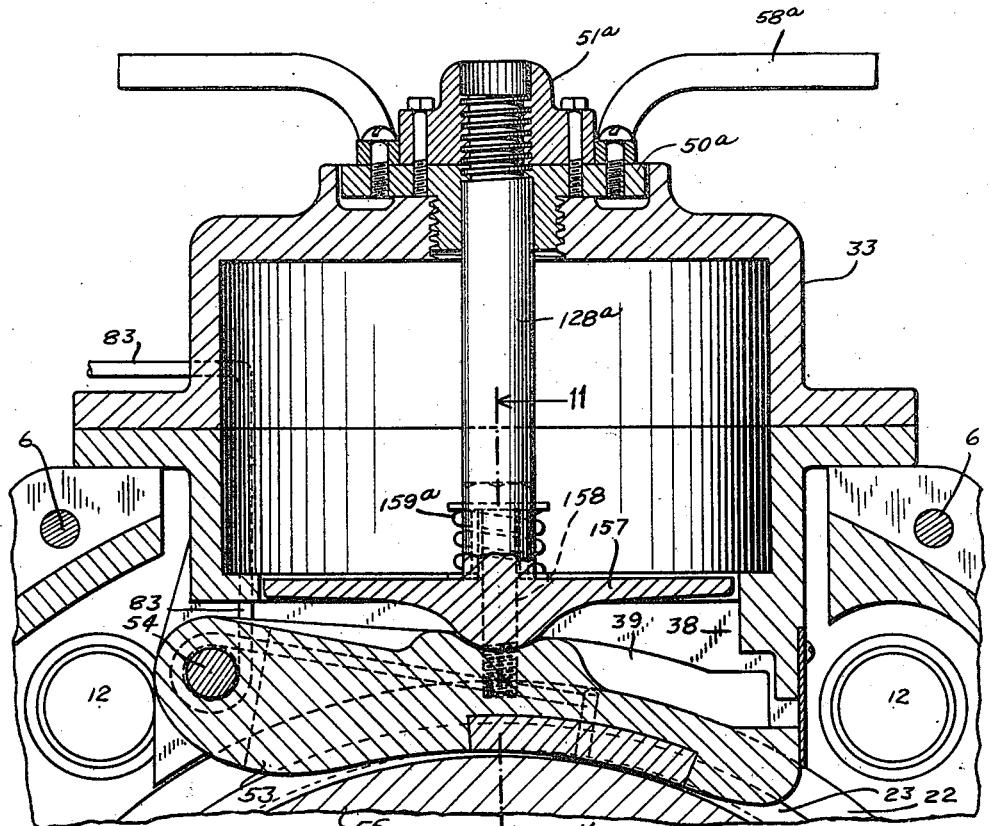
Figure 11:
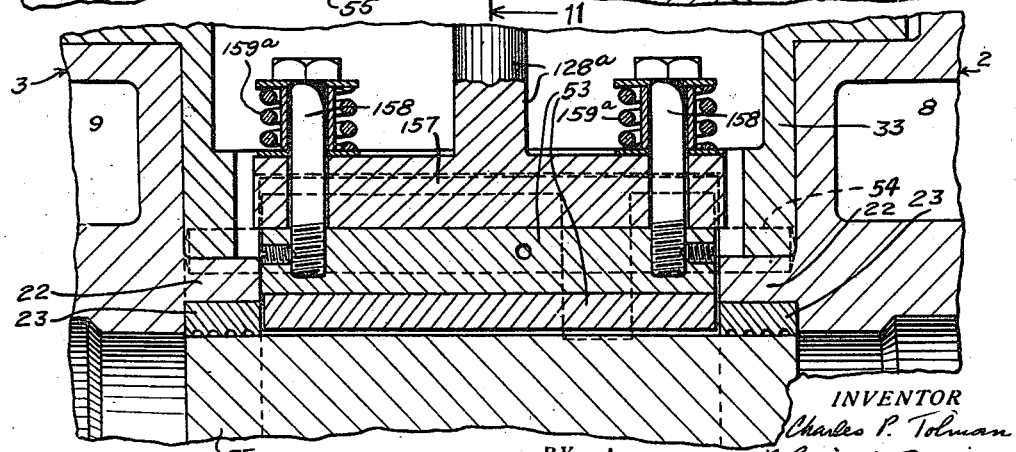
Figure 12:
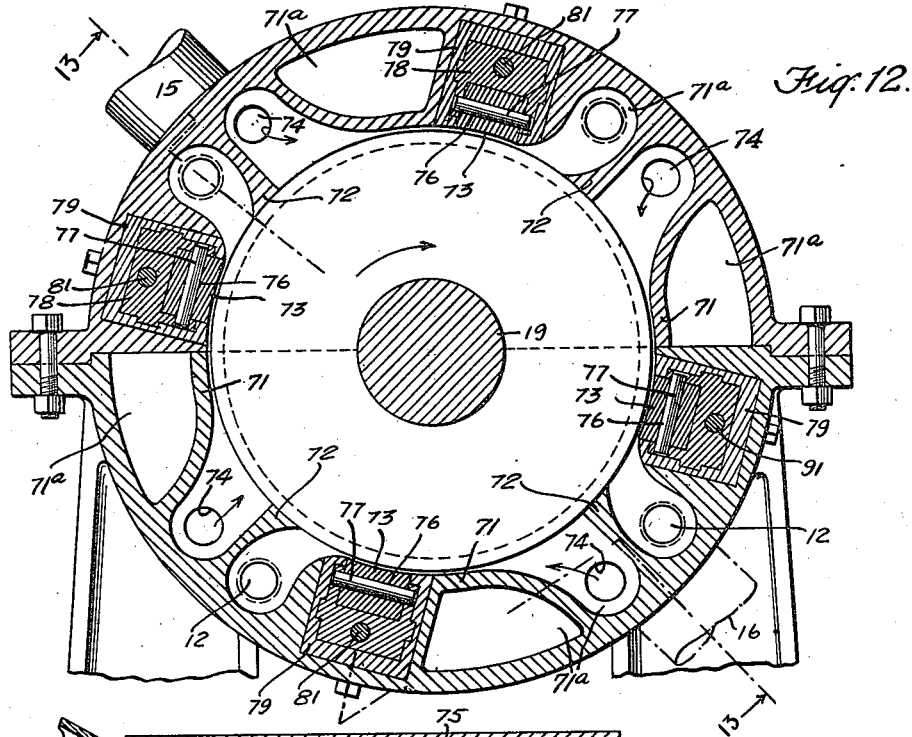
Figure 13:
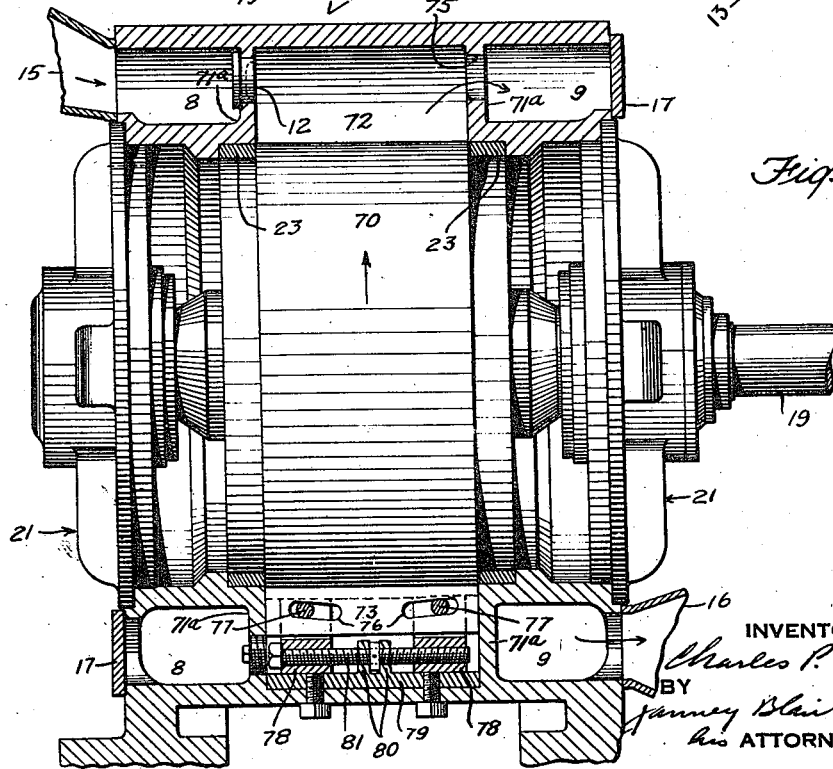

A further object has been to provide a material treating machine which affords varied control of the feeding and discharge of treated material. For this purpose, the inlets and outlets may be readily connected and/or disconnected with a minimum of interruption in operations. Other advantages and beneficial features of my invention will be apparent from the following description of a preferred embodiment thereof taken in connection with the appended drawings, in which:

Figure 1 is a side elevation with parts broken away to disclose a typical central vertical section of a portion of the apparatus with stator units in operative position;

Figure 2, a transverse radial section on the line 2—2 of Figure 1;

Figure 3, an enlarged central longitudinal section of one form of stator unit including a shearing shoe and pressure actuated means for moving said shoe toward the rotor;

Figure 4, an enlarged section on the line 4—4 of Figure 1 showing interior portions of the stator and pressure control units;

Figure 5, an enlarged section on the line 5—5 of Figure 4;

Figure 6, an enlarged section on the line 6—6 of Figure 1;

Figure 7, an enlarged sectional fragmentary view of a modified form of pressure and gap control mechanism;

Figure 8, a fragmentary end view showing the top of one of the pressure units in its relation to the housing and with connections for supplying air under pressure to and venting air from interior portions of the unit;

Figures 9, a schematic representation of the rotor in relation to a plurality of stators and control devices for regulating shearing gap or working pressure between the stator and the rotor during operation;

Figure 10, a central vertical section, enlarged, of a further modified form of pressure and gap control unit;

Figure 11, a section on the line 11—11 of Figure 10;

Figure 12, a modified form of housing with fixed stators and provision for multiple path operation;

Figure 13, a section on the line 13—13 of Figure 12;

Figure 14, a schematic representation of a development of interior portions of a device of the type shown in Figures 1 to 3, for example, and illustrating a multiple mode of operation, that is, one in which material to be treated is fed simultaneously to a plurality of material treating zones and the output therefrom is continuously withdrawn;

Figure 15, a similar view of the apparatus of Figures 1 to 3 inclusive slightly modified to effect repeated treatment of material in series;

Figure 16, a similar view of the device illustrated in Figures 1 to 3 inclusive with slight modifications to illustrate a mode of operation involving combined series treatment and the introduction of additional materials at different points in the progressive treatment of the material first introduced;

Figure 17, a sectional view showing a modification in which the inlet conduit carries material direct to the shearing surface of the rotor;

Figure 18, a section on the line 18—18 of Figure 17;

Figure 19, a bottom plan view of one form of shoe as shown in Figures 17 and 18;

Figure 20, a bottom plan view of another form of shoe in which the character of the roughened shearing surface differs from that of the shoe illustrated in Figure 19; and Figure 21, a section, illustrating a modification, in which the stator overlaps edge portions of the rotor.

Referring to the drawings, my invention is conveniently embodied in apparatus in which a housing or main casing is formed preferably of two substantially identical cooperating parts, as castings 2 and 3, having contiguous overlapping annular flanges 4 and 5 respectively, held together by any suitable means such as bolts 6. When so assembled, said castings provide in effect three substantially annular chambers or passageways, namely, a middle working or shearing chamber or compartment 7 and side or conduit chambers 8 and 9 respectively, Figure 2. The working or material treating compartment 7 communicates with the side chamber 8 through openings 10 and with the side chamber 9 through openings 11. Plugs 12 or other suitable stopping members may be used to close the openings 10 or 11 or any of them.

Under some conditions of operation, adjacently positioned openings 10 and/or adjacently positioned openings 11 are connected by suitable means such as a U-shaped fitting or return bend 13, Figures 15 and 16. The plugs 12 and the return bends 13 are positioned and adapted to be readily applied and removed, access being had thereto through openings 14 in the outer side walls of the chambers 8 and 9 respectively. One or more of these openings on each side may be provided with inlet means 15 and/or outlet means 16. Although the elements just referred to are identified respectively as inlet means and outlet means, it is contemplated that under some conditions of operation the outlets may well serve as inlets and the inlets serve as outlets. They are broadly therefore shearing compartment ports communicating with the interiors of the respective side or conduit chambers 8 and 10 or other material supplying or holding means. The openings 14 are normally closed by suitable means, as removable cover plates 17.

A rotor 18 is concentrically mounted in a rotor chamber provided in the main casing and with a portion of its peripheral working or shearing surface exposed within the shearing chamber 7. A rotor carrying shaft 19 has its opposite ends journaled in bearings 20 carried by spiders 21, Figure 2, which span the end openings of the rotor chamber and which are preferably removable so that the rotor may be readily inserted and removed from operative position without dismantling the casing. With this form of rotor mounting, the end faces thereof run free, thereby confining power expenditure in operation chiefly to effective work done at the periphery of the rotor in shearing the film. The casing is provided with inwardly extending annular flanges 22, forming with adjacent walls thereof an annular groove or recess adapted to accommodate packing strips or rings 23 or the like, operatively arranged in effective packing relation to the edge portions of the shearing surface of rotor 18 which with shaft 19 is actuated by any suitable means such as a motor, not shown. As indicated in Figures 4 and 6, the inner face of each packing ring 23 is provided with a shallow spiral groove 123 having its inner end opening upon the inner edge of said ring and in such a direction that material leaking from the shearing compartment into said spiral grooves tends to be drawn inwardly toward the rotor during normal operation.

In the form of device illustrated in Figures 1 and 2 material to be treated is moved into a shearing gap or treatment zone between the peripheral surface of rotor 18 and the working surfaces of stators or shoes 24. It is contemplated, however, that the shearing or other effect so produced may result from other arrangements of parts similar or equivalent to those mentioned.

In the case of apparatus embodying or employing a plurality of stator members or shoes 24 in operative association with a single rotor member 18, a baffle 25 is interposed in the work or shearing chamber 7 between each two adjacent shoe members 24 and extending transversely across said chamber in the space between adjacent openings in the side thereof so that, under some conditions of operation, one of said openings may function as an inlet to admit material for treatment at one end of the shoe member 24 while the other opening permits discharge of the treated material as it comes from the opposite end thereof. Other operative arrangements of these parts will be more fully considered hereinafter.

In the apparatus shown in Figure 3, the stator in the form of a shoe 24 pivotally mounted at 26 as part of a removable stator unit including a casing 33 is provided with a working or shearing surface and an approach or converging guiding surface arranged at an angle thereto at the approach or material inlet end of the stator so that the material to be treated is in effect wedged into the shearing gap. Said shearing surface or a portion thereof conforms somewhat to the contour of the peripheral surface of the rotor and when in operative position provides a restricted gap between the rotor and the stator within or in connection with which the typical disintegrating, mixing, or shearing action takes place. This shearing gap surface may be smooth or it may include roughened portions as 27; or the stator may carry a removable and/or renewable insert, as 28, of a different material from the material of the stator or having characteristics different from those of the material of the stator, such for example as would render it too expensive or unsuited to constitute the whole body of the stator.

In the modification shown in Figures 17 to 20 inclusive, the shoe 24 is provided with laterally disposed guiding flanges 124 at opposite sides of the entrance throat; and the shearing face may be roughened by providing the angularly shaped grooves 127 as in Figure 19, the parallel grooves 127a as in Figure 20, or other suitable irregular surface markings or deformations.

Although the stator, in some embodiments of my invention, may be rigidly mounted in relation to the rotor 18 so as to define a gap of fixed dimension therebetween, I prefer to mount the stator in adjustable relation to the rotor to vary the gap within which the shearing operation takes place or to vary the pressure on the material under treatment in said gap. Any suitable means for effecting this result may be utilized although a preferred form, shown in detail in Figure 3, includes a stator moving member, as a fluid pressure operated piston rod 128, mounted to be moved toward and away from said stator and in such a way as to cause movement thereof toward the rotor and to permit or cause movement thereof away from the rotor, if desired. The piston rod 128, provided with a bearing head 29 is assembled with its inner end in the casing or stator carrier unit 33 adapted to be removably secured to the castings 2 and 3. In the form shown, the piston rod is moved forwardly by pneumatic means including annular diaphragms 129 embracing said piston rod and secured thereto between spaced collars 30 and discs 31. Peripheral portions of each disc 31 and diaphragm 129 are interposed between annular partition members 32 secured in said removable casing 33 and with their central openings embracing the collars 30, said openings being lined with flanged packing rings 35, normally held in operative position by means of washers 36, secured to the partition members by means of rivets 37 or the like.

Spaced rods 38 having their lower ends pivotally secured to ribs 39 extending upwardly from the stator adjacent to its outlet end have their respective free ends extending into recesses 40 in the removable casing 33, Figure 4. Each free end is provided with spaced washers 41 and 42, and a terminal nut 43. A spring 44 interposed between the washers 41 and 42 tends to move the rod 38 upwardly or outwardly away from the rotor 18 and in the absence of spring compressing pressure on the diaphragms 129, holds the stator 24 in retracted position in relation to said rotor.

Downward endwise movement of the piston rod 128 with its head 29 bearing against an upper surface of the stator 24 causes said stator to be deflected toward the rotor against resistance of the springs 44 above referred to. Where this endwise movement of the piston rod is effected by fluid pressure, I provide actuating devices therefor including the diaphragm construction hereinabove described and means for supplying air or other suitable fluid under pressure at the upper side of said diaphragms. As indicated in Figure 3, a branch air line, as 59, communicates with an inlet duct 46 extending through portions of the partitions 32, each of which is provided with a communicating air passage 47. Thus, when air under pressure is admitted to the inlet duct 46, it is effectively distributed into the space between each partition 32 and the adjacent lower diaphragm 129 which then moves toward the adjacent lower disc 31. The space between the other or lower side of each diaphragm and the upper side of the next lower partition 32 is vented to atmosphere by any suitable conduit arrangement extending from said space to the outer air, as for example, through passages 48 connected with vent ducts 49, Figures 5 and 6. Another duct 146 communicating with the spaces above the diaphragms 129 is normally closed by a cap 147. As shown in Figure 8, a pipe 149 may be inserted between duct 146 and one of the vent ducts 49 thus connecting the spaces at both sides of the diaphragm with the air pressure supply for the purpose of clearing or blowing out said spaces. In this case the air admitted under pressure through pipe 59 will be vented through the other of the vent ducts 49.

Suitable means are provided for adjustably limiting the extent of movement between the stators and the rotor. In the illustrated embodiment, wherein the stator is movable toward and away from the rotor, and where a portion of this movement, as toward the rotor, is effected by means of a piston rod 128, operated as hereinbefore described, or in any other suitable way, I provide adjustable means for limiting the extent of said movement. For this purpose, Figure 3, a bushing 50 is screw-threaded into the casing 33 and embraces the shank of piston 128, at the outer end of which is a threaded portion carrying a nut 51. To provide the necessary strength, both sets of threads are relatively coarse; and to permit a fine or substantially micrometer adjustment of the parts, the number of threads per inch on the bushing is different by a small amount from the number of threads per inch on the nut. In the illustrated device, the threads on the bushing 50 are on the order of four and one-half threads per inch of length, whereas the threads on the nut 51 are on the order of four threads per inch of length. Thus, with the bushing 50 in position and the piston and associated parts in assembled relation thereto, the outer face of the bushing 50 cooperating with the inner face of said nut 51 forms a stop to limit the inward movement of said piston rod 128.

By suitably adjusting the position of rotation of the bushing 50, in relation to said casing 33, and by the coordinated rotation of nut 51 effected by a pin 52 connecting said nut and said bushing, the minimum gap position of the stator 24 is accurately fixed. In other words, this adjustment determines the limit of movement of the stator toward the rotor when urged by the pneumatic pressure devices. If desired, this or other position or positions of adjustment may be effectively fixed and/or predetermined and made readily available by suitable means. For example, the bushing 50 and nut 51 are operatively connected in any predetermined relation by means of said pin 52 which has a threaded head portion engaging an interiorly threaded portion of a recess in the nut 51 and having an end portion extending into a recess in the bushing 50. Obviously, a number of recesses in the bushing may be provided to define a corresponding number of different positions of gap adjustment. In the form of device shown in Figure 1, the limit of upward movement of the head of piston rod 128 is the bottom surface of the lowermost partition 32.

In operation, the piston rod 128 is normally held in outward or retracted position by springs 44, the extent of its movement being limited as above described. To diminish the working gap between the stator 24 and the rotor 18, either with the rotor operating or idle, air under pressure is admitted to the duct 46 and actuates the parts as above described to force the piston rod 128 downwardly and against a portion of the upper surface of stator 24. When the stator is at its minimum gap position or somewhere between said minimum and maximum positions, the fluid under pressure serves as a cushion or resilient body against which the pressure within the gap exerts itself or is balanced. Thus, the described arrangement constitutes means for regulating or varying the gap and for introducing a safety factor to compensate for or to prevent excessive or destructive pressures between the shoe and the rotor.

In connection with the gap and film pressure control devices hereinabove described, I utilize in a preferred embodiment of my apparatus, suitable means for indicating pressure conditions at the gap or at other predetermined positions. For this purpose, as shown in Figures 3 and 9 an opening 80 in the shearing surface of the stator 24 communicates with a passage 81 which in turn is connected with a conduit 83 having a suitable pressure registering instrumentality 84, Figure 9.

As indicated in Figure 9, air under pressure from any suitable source, as a tank 159, is controllably supplied to one or more of the several units either direct or through controlling devices if desired.

Referring to Figure 9, wherein my improved apparatus is illustrated as including a plurality of stators 24, I have also provided means for independently and/or collectively varying the shear gaps and/or the pressure on material therein, said means including the branch air lines 59 each having a valve 60 and all communicating with a main air line 61 having a controlling valve 62. Thus, with the valve 62 open, individual adjustments or variations of the gap between the rotor and the several stators may be made by manipulating the valves 60. If collective and simultaneous adjustment or variation of the gaps or pressure on the material therein is required, the valves 60 all remain as set and valve 62 is manipulated.

A device for manual adjustment of the stator is shown in Figures 10 and 11 wherein the piston 128a is provided with a head 157 which has a flexible connection with shoe 53, through the bolts 158. A spring 159a is operatively interposed between the upper face of the shoe and the lower surface of the head of each bolt. In this construction, the shoe is moved either way depending on whether the piston 128a moves inwardly or outwardly in response to turning of the threaded bushing 50a and the nut 51a by the handle 58a. This construction provides an effective and simple manual gap and pressure control where the more complicated automatic control is not required.

In connection with parts of the structure shown in Figures 10 and 11, I may utilize the modification shown in Figure 7 wherein the lower end of piston 128a is provided with a terminal ball 128b engaging a suitable socket forming part of the shoe and thus affording a flexible connection between said shoe and the unit casing 33 which carries means for effecting endwise movement of piston rod 128a, as shown in Figure 10 for example.

In the modification illustrated in Figures 12 and 13, a rotor 70 is operatively mounted in a casing provided with spaced annular partitions 71a extending inwardly from the outer wall of the casing toward the periphery of the rotor and forming in effect the side walls of an annular compartment or chamber divided into separate shearing compartments which open toward the rotor. Transverse baffles 72 extending inwardly from the casing and arranged at spaced intervals between the said partitions 71a form in effect the end or dividing walls of said separate shearing compartments. The inwardly exposed openings of said compartments are closed by the peripheral surface of rotor 70 co-operating with the ends of said baffles 72 and the inner edges of the partitions 71a. Each shearing compartment is further sub-divided into inlet and outlet compartments by means of a partition 71 arranged transversely therein and which carries an adjustable shearing member or stator 73 mounted with its interiorly directed surface opposed to and spaced from the peripheral surface of rotor 70 to form therewith an effective shearing gap. Corresponding subdivisions of the annular shearing chamber or compartment of the mill shown in Figure 1 into separate compartments are effected by the baffles 25 and stator head assemblies including casings 33 and shoes 24.

Referring again to Figures 12 and 13, an opening 74 through the partition 71a at one side of the inlet compartment affords an inlet for the material to be treated, and an opening 75, Figure 13, in the partition 71a at the opposite side of the outlet compartment provides an outlet for the treated material. Thus, when material is admitted into a compartment through inlet opening 74 and delivered upon the periphery of the rotor in advance of the stator, rotation of the rotor forces said material into and through the gap at 73 where it is subjected to the desired hydraulic shearing effect after which it is discharged from the outlet compartment through an outlet opening 75.

As shown more clearly in Figure 13, the stator portions 73 may take the form of adjustable shoes in which case their positions in relation to the rotor are controlled by suitable devices. For example such a shoe is provided with slots 76 co-operating with pins 77 mounted on carriers 78 secured to a removable base 79 provided with a bearing lug 80 for a screw 81 which is threaded right handedly into one of said carriers and left handedly into the other. By turning said screw, the shoe is advanced toward or retracted from the rotor, as desired to adjust the extent of opening of the shearing gap or the pressure on the material therein.

In Figures 14, 15 and 16 respectively, I have illustrated schematically three different modes of operation, from among many, of the mill shown in Figures 1 and 2 or 12 and 13, which will serve to indicate in part the contemplated scope of utility of my improved device. Referring to the arrangement of Figure 14, the side chamber 8 is adapted to receive material to be treated through inlet 15. The several stators, represented as 24a, 24b, 24c and 24d are positioned with their shearing surfaces in opposed relation to a rotor (not shown). Material to be treated is admitted at the inlet side of the stator 24a, for example, through one of the openings 10. A corresponding opening 11, opposite said opening 10 and communicating with the discharge or side chamber 9 is closed by means of a plug 12. Accordingly, the material to be treated moves in the direction of the arrow through the shearing zone past stator 24a into the discharge chamber 9 through opening 11a. It will be noted that the corresponding inlet opening 10a opposite said outlet is also closed by a plug 12. Thus, the material to be treated is subjected to a single run through the shearing gap and is then discharged into the discharge casing or chamber 9. The operation in respect to the remaining stators is simultaneous with and the same as that above described so that the machine is now performing as the equivalent of four film shearing devices, the combined output of which discharges through the outlet 16.

In case an obstruction occurs at the inlet end of one of the stators, as 24a for example, the plug 12 opposite the inlet opening 10 may be removed to permit dislodgment and discharge of the obstructing objects or materials.

A somewhat different result is effected by the arrangement illustrated schematically in Figure 15. Material to be treated is fed into the side chamber 8 through the inlet 15 and from said side chamber into the shearing chamber through inlet 10. The remaining inlets 10 are closed by means of plugs 12 and the opening 11 opposite the open inlet 10 is also closed by a plug, as 12. The remaining openings 11a, except the last one in the series, as 11b, shown at the right hand side of Figure 15 are connected, as indicated, by return bends 13, the arrangement being such that an opening 11a occurring at the discharge side of a stator as 24a is connected by the return bend 13 with an opening 11a communicating with the inlet side of the next stator 24b. A similar arrangement is effected in relation to stators 24b and 24c and 24d. Where the mill is made up in effect of four units, as indicated, the opening 11b, appearing at the extreme right, serves as an outlet for discharging material into the side chamber 9 from which it may in turn be discharged through outlet 16. With the parts arranged as hereinabove described, it will be clear that a single mill is made to operate in effect as a series of mills, the treated material being delivered from one shearing zone into position for treatment in another or in a plurality of shearing zones without leaving the machine and in a continuous operation, any suitable number or different numbers of stator units being connected to effect various predetermined results or products.

In the modified scheme of operation illustrated in Figure 16, the connections between shearing units are such that material may be added to partly or wholly treated material. For example, material is admitted through inlet 15 into the side chamber 8. The material then enters the shearing chamber of stator 24a through opening 10, some of the remaining openings being closed by plugs 12 depending on the results desired. In an illustrative case, all these openings except 10b and 10c are closed and the opening 11 opposite opening 10 is also closed by a plug 12. A return bend 13 connects the opening 11a, associated with stator 24a, and the opening 11b associated with stator 24b in such a way as to conduct treated material from the chamber of 24a directly into the chamber of 24b for further shearing action therein. An inlet conduit 15b is provided to admit an added material through opening 10b into the shearing chamber of stator 24b where it mixes or otherwise co-acts with the treated or partly treated material from the shearing chamber of stator 24a. The sheared product of stator 24b is then conducted through return bend 13b into the shearing chamber of stator 24c. If further material is to be added to this product, an inlet conduit 15c admits such further added material through opening 10c into said chamber of stator 24c; and this material with the product from the preceding stator chamber is again subjected to shearing action. If the material requires further shearing treatment, the product from chamber 24c may be conducted through return bend 13c into the chamber of stator 24d from which it is discharged through opening 11 into side chamber 9 and from said side chamber 9 through outlet 16. Thus, with the parts arranged as above described, the apparatus functions partly as a film shearing apparatus and partly as a homogenizer or material mixing apparatus, thus producing in one continuous operation a result difficult if not impossible to accomplish even by the repeated use of known types of colloid mills.

In the modification shown in Figures 17 and 18, a feed pipe 82 extends through one of the openings 14, across the feed chamber 8 and through an opening 10. Its inner end is bent downwardly to deliver material substantially upon a median zone of the peripheral surface of rotor 18. In operation, as the material strikes the surface of said rotor, it is promptly forced between the flanges 124 of the shearing shoe with a minimum of spreading or dispersed flow toward the lateral edges of the rotor and a consequent reduction of leakage past the packing rings 23. Obviously the return bends 13 may be provided with discharge spouts or extensions corresponding in function to the inner end of said feed pipe 82 and may be utilized either with or without a feed chamber as 8 or a discharge chamber as 9, depending upon the circumstances involved in the contemplated dispersing or reducing operation.

Referring again to Figure 1, I provide means along the sides of the shoes 24 to minimize leakage or diversion of untreated material from the inlet end of the shearing zone past the shoe to the outlet end. For this purpose I have found it effective to provide cuts or tapered channels, as 200, arranged in side faces of the shoes 24, and which under cut or extend beneath the edges of resulting or corresponding sharp detents 201 presenting their edge portions in opposed relation to the direction of rotation of the rotor 18. These channels and detents intercept fibrous or other particles of material being treated until automatically formed barriers are built up between the shoes and adjacent interior surfaces of the casing, thus preventing or minimizing leakage past the shoes.

Reference is made herein to co-pending applications Serial No. 120,313, filed January 12, 1937, and Serial No. 120,314 filed January 12, 1937, wherein I claim certain subject matter relating more particularly to junk removing means and leak arresting means respectively disclosed but not claimed herein.

I claim as my invention:

1. Apparatus for treating material in liquid form or carried in a liquid medium comprising a high speed rotor having a solid imperforate peripheral working surface, a stator positioned in adjustable relation thereto, a casing for the stator and the rotor provided with partitions cooperating with the peripheral surface of the rotor to form a treating compartment having an inlet port at the inlet end of the stator and an outlet port at the outlet end of said stator, whereby material to be treated is first admitted through said inlet port, passes through the treatment zone with and in the direction of rotation of the rotor and is then discharged through said outlet port.

2. Apparatus according to claim 1 and further characterized in that the stator is movable toward and from the rotor periphery, and cushioning means arranged in operative relation to the stator are provided to maintain a substantially constant predetermined pressure on material being treated between the rotor and the stator.

3. Apparatus according to claim 1 and further characterized in that two or more stators are mounted in the casing with their inner faces arranged to form, with the periphery of the single rotor, as many treatment zones as there are stators, and partitions are provided to form separate treating compartments each having openings whereby untreated material is admitted to the inlet end of a stator and the treated material is discharged from the outlet end thereof.

4. Apparatus according to claim 1 and further characterized in that an inlet conduit extends into the treating compartment and provides an opening through which to deposit untreated material on a portion of the peripheral surface of the rotor in advance of the stator.

5. In material treating apparatus, the combination of a casing having walls arranged to define a rotor chamber, a feeding chamber, a discharge chamber and a treating compartment between said feeding and discharge chambers and surrounding a portion of the rotor chamber and having an inwardly directed opening through a wall of the casing into said rotor chamber, a rotor mounted in the rotor chamber with its periphery extending across and closing said opening, a stator in the treating compartment in operative working relation to the rotor, an opening from the feeding chamber to the treating compartment to admit material to be treated therein and an opening in the wall from said treating compartment to the discharge chamber to discharge treated material.

6. In material treating apparatus, the combination of a casing having spaced concentric walls and spaced partitions arranged between said concentric walls to form therewith a rotor chamber, a feeding chamber, a discharge chamber, and a treating compartment arranged between said feeding and discharge chambers and having an opening directed toward the rotor chamber, a rotor in the rotor chamber with its peripheral surface extending across said opening, a stator in the treating compartment, an inlet opening in one of said partitions between the treating compartment and the feeding chamber, and a discharge opening in one of said partitions between the treating compartment and the discharge chamber.

7. In material treating apparatus, the combination of a rotor having a peripheral working surface, a casing arranged around said rotor and providing a rotor chamber and a treating compartment having an inner opening into said rotor chamber, and an outer opening opposite thereto, an inlet port for admitting material to be treated into the treating compartment, an outlet port for discharging treated material from said compartment, a stator in said treating compartment between said ports, and means for releasably supporting the stator in opposed relation to the working surface of the rotor to form a treatment zone extending transversely across the compartment, said stator being insertable into and removable from the compartment through said outer opening.

8. In material treating apparatus, the combination of a casing having spaced partitions arranged to form the side walls of a treating compartment, a feed chamber at one side thereof and a discharge chamber at the other side thereof, one of said spaced partitions being provided with an inlet port for admitting material to the treating compartment, and the other of said spaced partitions having a discharge port for discharging material from said compartment, an annular partition forming the peripheral wall of a rotor chamber and separating said chamber from said feed and discharge chambers, an opening through said annular partition between the treating compartment and the rotor chamber, a stator arranged in the treating compartment between said ports, and a rotor mounted in the rotor chamber and having portions of its peripheral surface exposed in the treating compartment through said opening in the annular partition and in operative relation to the stator to form therewith a treatment zone.

9. In material treating apparatus, the combination of a rotor having a peripheral working surface, a casing having partitions which cooperate with said working surface to form a plurality of separately operative treating compartments within the casing, an inlet port for each of said compartments for admitting material to be treated and an outlet port for each of said compartments to discharge treated material, and a stator in each treating compartment operatively arranged in relation to the rotor working surface to provide a treatment zone between said ports.

10. In material treating apparatus, the combination of a rotor having a peripheral working surface, a casing having walls arranged to form a central rotor chamber for housing said rotor and walls arranged to form a plurality of separately operative treating compartments each having an opening directed toward said rotor, said rotor being mounted with portions of its working surface exposed in said treating compartment through said opening, a stator mounted in each treating compartment and spaced from the peripheral surface of the rotor to form a treatment zone, an inlet port for admitting material into each treating compartment, and an outlet port for discharging treated material therefrom.

11. In material treating apparatus, the combination of a rotor having a peripheral working surface, a plurality of stators arranged radially in opposed relation to portions of said surface to form therewith a plurality of spaced treatment zones, means for delivering material to the inlet end of each zone, means for discharging material from the outlet end of each zone, and baffles disposed between said zones and adapted to cooperate with the rotor working surface to intercept and guide material treated in said several zones.

12. In material treating apparatus, the combination of a rotor having a peripheral working surface, a plurality of stators arranged in opposed relation to spaced portions of said surface to form a plurality of spaced treatment zones, baffles disposed between said zones and adapted to cooperate with the rotor working surface to intercept and guide material treated in said zones, inlet ports each having an effective opening between a baffle and an inlet end of a zone, and outlet ports each having an opening between the outlet end of said zone and the next adjacent baffle.

13. In material treating apparatus, the combination of a rotor having a peripheral working surface, a plurality of stators arranged in opposed relation to spaced portions of said surface and means which in cooperation with said stators form spaced and separate treatment zones, and material inlet and outlet means arranged between adjacently disposed stators, said inlet means being arranged and adapted to feed material to the rotor working surface at one end of each stator, and said outlet means being arranged and adapted to intercept and discharge treated material from the other end thereof.

14. In material treating apparatus, the combination of a rotor having a peripheral working surface, a plurality of stators arranged in opposed relation to spaced portions of said surface and means which in cooperation with said stators form spaced and separate treatment zones, material inlet means at one end and material outlet means at the other end of the stator, and a baffle operatively positioned between the outlet end of each stator and the inlet end of the next stator in the direction of rotation of the rotor.

15. In material treating apparatus, the combination of a rotor having a peripheral working surface, a casing having partitions arranged in cooperating relation with said surface to form side and end walls of a plurality of separately operative material confining and treating compartments disposed radially around the periphery of the rotor, an inlet port and an outlet port for each compartment, and a stator in each compartment between the inlet and outlet ports thereof and cooperating with said rotor to form therewith a treatment zone.

16. In material treating apparatus, the combination of a rotor having a peripheral working surface, a plurality of stators in opposed relation to spaced portions thereof to form treatment zones, a casing carrying said rotor and said stators and having an inlet opening for each zone for admitting material to be treated in said zones and an outlet opening for discharging material after treatment in each of said zones, a manifold operatively connecting the outlet openings of some of said zones and a manifold operatively connecting the inlet openings of some of said zones.

17. In material treating apparatus, the combination of a rotor having a peripheral working surface, a casing having partitions arranged in cooperative relation with said surface to form the side and end walls of a plurality of separately operative material confining and treating compartments positioned radially around the periphery of the rotor, an inlet port and an outlet port for each compartment, a stator in each compartment between the inlet and outlet ports thereof and cooperating with said rotor to form a treatment zone, and a conduit having one end opening into one of said compartments and the other end opening into another of said compartments and adapted to convey material treated in said one compartment from that compartment into said other compartment.

18. In material treating apparatus, the combination of a casing having wall portions which define a rotor chamber provided with an end opening, and a material treating compartment surrounding a portion of said chamber and having an inwardly directed opening into said rotor chamber, a rotor adapted to be inserted into said rotor chamber and removed therefrom through said end opening, rotor supporting bearings removably mounted in said end opening to receive a rotor in position with portions of its peripheral surface exposed in said treating compartment through said inwardly directed opening and effectively separating said compartment from communication with the rotor chamber, a plurality of stators in the treating compartment, an inlet opening in the treating compartment for each stator for material to be treated therein, an outlet opening in said treating compartment for each stator to discharge treated material and baffles arranged in said treating compartment between the outlet opening of each stator and the inlet opening of an adjacent stator and adapted to intercept treated material and guide it to said respective outlet openings.

19. In material treating apparatus, the combination of a casing having walls adapted and arranged to form a rotor chamber and a plurality of separate stator compartments, a rotor mounted in the rotor chamber and a stator mounted in each of the stator compartments in operative relation to the rotor and adapted to form with said rotor a plurality of independently operable treatment zones, means for feeding material to the inlet end of each zone, and means for discharging material from the outlet end of each zone.

20. In material treating apparatus, the combination of a casing having walls adapted and arranged to form a rotor chamber and a plurality of separated stator compartments, a rotor mounted in the rotor chamber and a stator mounted in each of the stator compartments in operative relation to the rotor and adapted to form with said rotor a plurality of independently operable treatment zones, each of said stator compartments being provided with an inlet port for delivering material into contact with the rotor in advance of the stator in such compartment and with an outlet port for discharging material from said compartment after treatment therein.

21. In material treating apparatus, the combination of a casing comprising an outer wall and an inner annular wall arranged to form a rotor chamber and a peripherally arranged treating compartment surrounding a portion of said chamber, an opening through said inner wall between the treating compartment and the rotor chamber, and spaced lateral walls defining the sides of said treating compartment, a rotor operatively arranged with portions of its peripheral surface disposed in said treating compartment and closing said opening, stators positioned between said lateral walls and cooperating with said rotor to form treatment zones, and said lateral walls having inlet and outlet openings in operative relation with each of said stators and adapted respectively to admit untreated material into the treating compartment and to discharge treated material therefrom, and baffles arranged in the treating compartment and adapted to intercept treated material and guide it to said outlet opening.

22. Apparatus according to claim 1 and further characterized in that the casing includes a plurality of treating compartments, each having an inlet port and an outlet port and partitions arranged and adapted to define respectively a chamber or manifold for presenting a supply of untreated material in position to be fed into said compartment through said inlet port and a chamber or manifold adapted to receive material as it is discharged from said compartment through said outlet port.

CHARLES P. TOLMAN.